US007849082B2

(12) United States Patent
Westphal (10) Patent No.: US 7,849,082 B2
(45) Date of Patent: Dec. 7, 2010

(54) SYSTEM AND METHOD FOR INFLUENCING DISPLAY OF WEB SITE CONTENT (75) Inventor: Geoffry A. Westphal, Park Ridge, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 477 days.

(21) Appl. No.: 11/601,537

(22) Filed: Nov. 17, 2006

(65) Prior Publication Data

US 2008/0120542 A1 May 22, 2008

(51) Int. Cl.
G06F 17/30 (2006.01)
(52) U.S. Cl. ...................................... 707/731
(58) Field of Classification Search ................. 707/724, 707/731
See application file for complete search history.

(56) References Cited

U.S. PATENT DOCUMENTS

| | | | |
|---|---|---|---|
| 6,335,765 B1 | 1/2002 | Daly et al. | |
| 6,339,747 B1 | 1/2002 | Daly et al. | |
| 6,498,987 B1 | 12/2002 | Kelly et al. | |
| 6,654,689 B1 | 11/2003 | Kelly et al. | |
| 6,823,263 B1 | 11/2004 | Kelly et al. | |
| 6,829,536 B2 | 12/2004 | Moore | |
| 6,856,323 B2 | 2/2005 | Moore | |
| 6,961,061 B1 | 11/2005 | Johnson et al. | |
| 7,058,510 B2 | 6/2006 | Kelly et al. | |
| 2002/0122564 A1* | 9/2002 | Rhoads et al. | 382/100 |
| 2002/0154642 A1* | 10/2002 | Hagirahim et al. | 370/401 |
| 2002/0184068 A1* | 12/2002 | Krishnan et al. | 705/8 |
| 2003/0061283 A1 | 3/2003 | Dutta et al. | |
| 2003/0212594 A1* | 11/2003 | Hogan | 705/14 |
| 2004/0054667 A1 | 3/2004 | Kake et al. | |
| 2004/0073538 A1* | 4/2004 | Leishman et al. | 707/3 |
| 2004/0083127 A1 | 4/2004 | Lunsford et al. | |
| 2005/0050097 A1* | 3/2005 | Yeh et al. | 707/104.1 |
| 2005/0105513 A1* | 5/2005 | Sullivan et al. | 370/352 |
| 2005/0273702 A1 | 12/2005 | Trabucco | |
| 2005/0289454 A1 | 12/2005 | Donelson et al. | |
| 2007/0106617 A1* | 5/2007 | Mabray et al. | 705/59 |
| 2007/0157228 A1* | 7/2007 | Bayer et al. | 725/34 |

OTHER PUBLICATIONS

Gettleman, Thousands Seek Safety as Hurricane Nears Gulf Coast, New York Times, Oct. 3, 2002.*
Ipligence, Marketing Brochure for IPligence, 4 pages, http://www.ipligence.com.

* cited by examiner

*Primary Examiner*—James Trujillo
*Assistant Examiner*—William Spieler
(74) *Attorney, Agent, or Firm*—Greenberg Traurig, LLP; Mark R. Galis; Gary R. Jarosik (57) ABSTRACT

A system uses geo-location information associated with a user's interaction with a web site portal to deduce a context for the user's interaction and then uses the deduced context to influence the display of web site content that is provided in response to the user's interaction. The context is deduced by considering one or more of an industrial density for a locale indicated by the geo-location information associated with the user's interaction, a current time for a locale indicated by the geo-location information associated with the user's interaction, a weather condition for a locale the geo-location information associated with the user's interaction, and a regulation for a locale indicated by the geo-location information associated with the user's interaction.

10 Claims, 6 Drawing Sheets

| Google | Web Images Groups News Froogle Maps more » |
| --- | --- |
| | tokyo  [Search] Advanced Search / Preferences |

Sign in

Web  Results 1 - 10 of about 333,000,000 for tokyo [definition]. (0.16 seconds)

Refine results for tokyo:

| Dining guides | Attractions | Suggested itineraries |
| Lodging guides | Shopping | Tours & day trips |

Tokyo - City Guide
About the city of Tokyo, Japan. ... The 23 city wards (ku) are the center of Tokyo and make up about one third of the metropolis' area, while housing ...
www.japan-guide.com/e/e2164.html - 65k - Jul 19, 2006 - Cached - Similar pages

Planet Tokyo
A guide to food, sights, lodging, and traveling in Tokyo with an emphasis on Japanese culture.
www.planettokyo.com/ - 10k - Cached - Similar pages

東京大学 - [ Translate this page ]
文京区と目黒区。総長の挨拶、入学案内、学部や研究所組織、附属施設のサイ...
www.u-tokyo.ac.jp/ - 13k - Jul 19, 2006 - Cached - Similar pages

:: Metropolis Tokyo :: Japan's No. 1 English Magazine ...
Weekly English city guide on clubs, bars, music, movies, TV, restaurants, exhibits, life and business...
metropolis.japantoday.com/ - 7k - Cached - Similar pages

Tokyo Tourism Info
Includes travel, shopping, amusement, and hot springs information. Provided by the Tokyo Metropolitan...
www.tourism.metro.tokyo.jp/english/ - 22k - Cached - Similar pages

Tokyo Journal
Tokyo Journal - Japan's oldest English-language magazine. Unbiased, unadulterated. Tokyo and Japan as seen through the eyes of those who know and live it.
www.tokyo.to/ - 3k - Cached - Similar pages

Tokyo - Wikipedia, the free encyclopedia
Prior to 1943, Tokyo was the name of both the prefecture and the city. ... In recognition of its special status, Tokyo is the only prefecture designated in ...
en.wikipedia.org/wiki/Tokyo - 112k - Jul 19, 2006 - Cached - Similar pages Sponsored Links

Tokyo
Get Excellent Deals on Airfare, Hotels, Rental Cars & More
Travel.AOL.com

Fly Tokyo Japan
Get your airticket cheap and easy
(877) 433-6796
www.TokyoJapan.us

Tokyo Tourism Info
Metropolitan Government Official Site. Welcome to Tokyo Japan!
www.tourism.metro.tokyo.jp

Tokyo Hotels Discounted
Save up to 70% - Large Range Guaranteed Lower Rates.
www.japaneselifestyle.com.au

Search Hotels In Tokyo
Hotels Ryokans and Resorts in Tokyo. All confirmed online in seconds
japanhotelsonline.net

Tokyo for Families
Tokyo Attractions, Fun and More. A Free Guide for Parents and Kids
NineBlue.com/Tokyo 110   FIGURE 1   120
(prior art)

| Item # | Qty. | Notes | Description | Brand Mfr. Model # | Ship Qty. | Usually Ships | Price | Catalog 397 Page |
|---|---|---|---|---|---|---|---|---|
| 4GL80 | | [N] | Ice Chest, Capacity 40 Quarts, Length 24 1/4 Inches, Height 14 Inches, Width 13 3/4 Inches. Heavy Duty Design, Support Loads Up to 300 Pounds. Plastic | IGLOO 408 | 1 | Today | $36.05 | 2695 |
| 3NY88 | | [N] | Ice Chest, Capacity 100 Quarts, Length 35 5/16 Inches, Height 16 3/4 Inches, Width 17 3/8 Inches | IGLOO 11442 | 1 | Today | $76.80 | 2695 |
| 1NZ54 | | [N] | Ice Chest, Capacity 150 Quarts, Length 41 5/8 Inches, Height 19 3/4 Inches, Width 18 7/8 Inches | IGLOO 44363 | 1 | Today | $114.10 | 2695 |
| 2NE63 | | [N] | Rolling Ice Chest, Capacity 70 Qt, Length 28 1/2 In, Width 16 1/2 In, Height 17 3/4 In, Body Color Blue, Lid Color White, Insulated Body and Lid | IGLOO 45333 | 1 | Today | $64.00 | 2695 |
| 4W973 | | [N] | Ice Melter, Size 50 Pound Carton, Granulated Compound, Contains Calcium Magnesium Acetate, Effective Temperature to -8 Degrees F, Color Blue | PREMIERE CPM050P | 1 | Today | $18.80 | 1239 |
| 4KA50 | | [N] | Ice Melter, Size 50 Pound Carton, Granulated Compound, Contains Calcium Magnesium Acetate, Effective Temperature to -20 Degrees F, Color Pink | PREMIERE SU050BX-GR | 1 | Today | $25.70 | 1239 |

FIGURE 6

SYSTEM AND METHOD FOR INFLUENCING DISPLAY OF WEB SITE CONTENT

BACKGROUND

The following relates generally to e-commerce and, more particularly, relates to a system and method for influencing display of web site content, such as advertising, search results, or the like.

In the art systems and methods for influencing display of web site content are known. For example, U.S. Published Application No. 2005/0076014 discloses a system and method that uses the local time of an end user to select and then display web site content in the form of advertising with end user local time specific content. U.S. Published Application No. 2004/0093325 discloses a system and method that uses a GPS deduced location of an organization from which a keyword search was initiated to influence the display of web site content in the form of keyword search results, e.g., a keyword search using "delta" returning web site content results related to airlines or web site content results related to faucets depending upon whether the search was initiated from an airport or a hardware store, respectively. Similarly, U.S. Published Application No. 2005/0080786 discloses a system and method that uses a GPS deduced location of a mobile device to influence the display of web site content by filtering and ranking web site content in the form of keyword search results.

While such known systems and method generally work for their intended purpose, a need remains for an improved system and method for influencing display of web site content and, more particularly, for influencing display of web site content for the benefit of business-to-business ("B2B") enterprises.

SUMMARY

To address this and other needs, disclosed hereinafter is a system and method that influences display of web site content. To this end, the system uses geo-location information associated with a user's interaction with a web site portal to deduce a context for the user's interaction and then uses the deduced context to influence the display of web site content that is provided in response to the user's interaction. The context is deduced by considering one or more of an industrial density for a locale indicated by the geo-location information associated with the user's interaction, a current time for a locale indicated by the geo-location information associated with the user's interaction, a weather condition for a locale the geo-location information associated with the user's interaction, and a law, rule, or a regulation (collectively "regulation") for a locale indicated by the geo-location information associated with the user's interaction. Display of the web site content is influenced by determining the appropriateness of displaying certain web site content, by highlighting certain web site content, by ordering lists of web site content, etc. While this generally summarizes the inventive concepts disclosed hereinafter, a better understanding of the objects, advantages, features, properties and relationships of the system and methods will be obtained from the following detailed description and accompanying drawings which set forth illustrative embodiments which are indicative of the various ways in which the principles of the invention may be employed.

BRIEF DESCRIPTION OF THE DRAWINGS

For a better understanding of the various methods for influencing display of web site content described hereinafter reference may be had to the following drawings in which:

FIGS. 1 and 2 are screen shots illustrating prior art systems used to present web site content;

FIGS. 5 and 6 are screen shot illustrating an exemplary search results page in which the display of web site content has been influenced using the inventive methods.

DETAILED DESCRIPTION

The following describes, with reference to the drawings, exemplary methods for influencing display of web site content, such as advertising, search results, or the like. In particular, the various methods described hereinafter utilize information pertaining to a system user's geo-location to deduce a context for a user's interaction with a web site and thereby influence the display of web site content, particularly to the benefit of business-to-business ("B2B") enterprises, i.e., B2B vendors and B2B customers. As will become apparent, display of the web site content is influenced by selecting which web site content is to be presented to a user, by arranging how web site content is to be presented to a user, and/or by displaying the web site content in a manner, such as by using highlighting, that is intended to call the attention of the user to particular web site content.

To provide an example of a system framework in which the subject invention may be advantageously utilized, it is to be appreciated that companies often purchase keywords from Internet portal companies, such as Yahoo, Google, etc., such that, when a user enters the purchased keyword as an Internet portal web site search query term, the user is presented with web site content that is intended to draw the attention of the user to the business of the keyword purchaser. Typically, the web site content that is displayed when a purchased keyword is entered by a user as a search query term is an advertisement in the form of a "sponsored link" for the one or more companies that purchased the user entered keyword. An example of such a system in operation is shown in prior art FIG. 1 which illustrates the search results 110 and "sponsored links" 120 of keyword purchasers returned to a user upon the user entering the keyword "Tokyo" as an Internet portal search query term. In this illustrated example, it is seen that the keyword purchasers are typically business-to-consumer ("B2C") companies, e.g., travel and hospitality related businesses.

In circumstances where a purchased keyword has multiple meanings a keyword purchasing company may not be obtaining economic benefit if they are paying to have their "sponsored link" displayed every time the purchased keyword is entered as an Internet portal search query term. For example, prior art FIG. 2 illustrates the search results 210 and "sponsored links" 220 of keyword purchasers returned to a user upon the user entering the keyword "apple" as an Internet portal search query term. In this illustrated example, if the user were actually interested in finding places to buy eating apples, apple orchards to visit, places or books to learn about apple varieties, etc., it is unlikely that the keyword purchasing B2C companies in this illustrated example will receive any economic return for this purchased keyword responsive "sponsored link" display, i.e., it is unlikely that the user will access a "sponsored link" 220 since it is not relevant to the actual interests of the user. Within this context it will be similarly appreciated that keywords in the form of product model number or SKU number can also have multiple meanings. For example a B2C company and a B2B company may have respective products which share a common product number and/or SKU number.

To address problems associated with keywords having multiple meanings and/or to cause display of web site content in a manner believed to provide a greater economic benefit to a business associated with the web site content so displayed, particularly B2B enterprises, the subject system and method functions to deduce a context for a user's interaction with a web site, e.g., the entering of an Internet portal search query term by a user, and to use the deduced context to influence the display web site content that is responsive to the user's interaction. For example, the subject system and method may function to use a deduced context to select and display web site content in a manner whereby a company, particularly in circumstances where the company pays a fee each time its purchased keyword "sponsored link" is displayed, should receive a relatively better economic return when their web site content is displayed in response to the entry of purchased keywords as query search terms. By way of further example, the subject system and method may function to use a deduced content to select and display web site content such as product search results which should ensure that a user is exposed to a product that the user is more likely to be looking for and, therefore, more likely to purchase. As will be described in greater detail hereinafter, the context may be deduced using geo-location information, such as Zip codes, latitude and longitude, etc., and other information associated with the location such as time, such as time of day, time of week, time of year, weather, etc.

Figure 3:
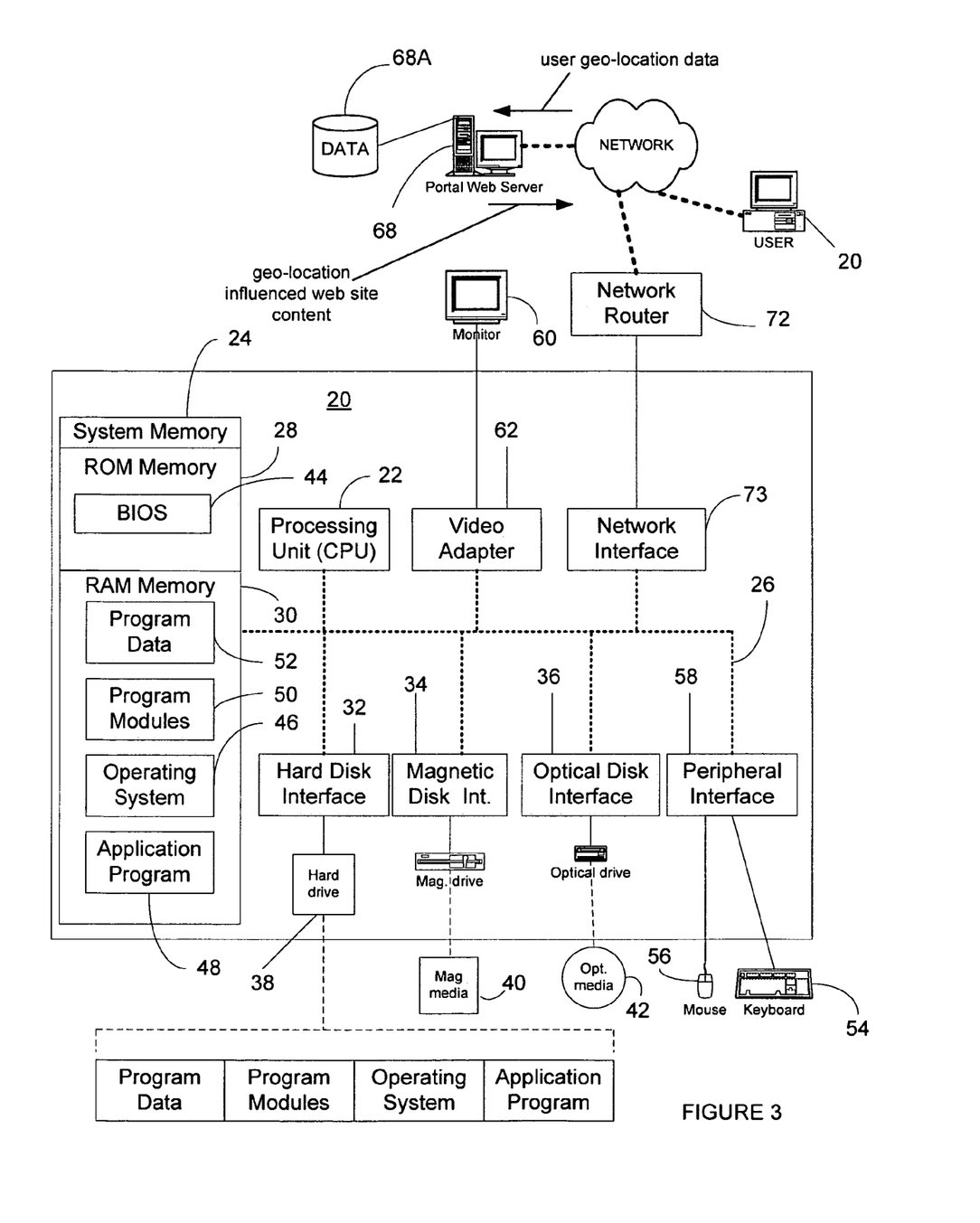
FIG. 3 is a block diagram illustrating an exemplary system in which the inventive methods used to influence display of web site may be practiced.

Turning now to FIG. 3, the system and method of the subject invention uses one or more of a plurality of processing devices linked via a network, such as the World Wide Web or the Internet. A client processing device 20, illustrated in the exemplary form of a computer system, provides a means for a user to access, navigate, and otherwise interact with a server processing device 68, illustrated in the exemplary form of an Internet portal/web site content server, via the network and for the server processing device 68 to provide to the client processing device 20 web site content, such as search results, advertising, electronic catalog pages, etc., retrieved from a storage repository 68A associated with the server processing device 68 in response to the user's interaction. Furthermore, the server processing device 68 and/or the client processing device 20 includes functionality which allows the system to deduce a context for a user's interaction with the server processing device 68 which deduced context is further utilized by the system to determine the appropriateness of providing to the client processing device 20 certain web site content. In addition or alternatively, the system may function to use the deduced context to influence the manner in which select web site content is presented or displayed to a user. Since the mechanisms by which a client processing device 20 may be used to access, navigate, and otherwise interact with the server processing device 68 are well known in the art they will not be discussed herein for the sake of brevity.

For performing the functions required of the processing devices 20 and 68, the processing devices include computer executable instructions that reside in program modules which may include routines, programs, objects, components, data structures, etc. that perform particular tasks or implement particular abstract data types. Accordingly, those skilled in the art will appreciate that the processing devices 20 and 68 may be embodied in any device having the ability to execute instructions such as, by way of example, a personal computer, mainframe computer, personal-digital assistant ("PDA"), cellular telephone, or the like without limitation. Furthermore, while the processing devices 20 and 68 within the system are illustrated as respective single devices, those skilled in the art will also appreciate that the various tasks described hereinafter may be practiced in a distributed environment having multiple processing devices linked via a local or wide-area network whereby the executable instructions may be associated with and/or executed by one or more of multiple processing devices.

More particularly, considering client processing device 20, which is also representative of all of the processing devices illustrated in FIG. 1, for performing the various tasks in accordance with the executable instructions, the client processing device 20 preferably includes one or more processing units 22 and a system memory 24 which may be linked via a bus 26. Without limitation, the bus 26 may be a memory bus, a peripheral bus, and/or a local bus using any of a variety of well known bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the client processing device 20. Those skilled in the art will further appreciate that any other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the client processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the processing devices as needed, for example, via a network connection.

A user may enter commands and information into the client processing device 20 through input devices such as a keyboard 54 and/or a pointing device 56. While not illustrated, other input devices may include a microphone, a joystick, a game pad, a scanner, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, universal serial bus (USB), or the like. To receive information from the client processing device 20, a monitor 60 or other type of display device may also be connected to the bus 26 via an interface, such as a video adapter 62. In addition to the monitor 60, the client computing device 20 may also include other peripheral output devices such as a speaker 53.

As further illustrated in FIG. 3, the client processing device 20 has logical connections to one or more remote processing devices, such as the server processing device 68 which, as noted above, may include many or all of the elements described above relative to the client processing device 20 as needed for performing its assigned tasks. Communications between the client processing device 20 and the server processing device 68 may be exchanged via a further processing device, such as network router 72, that is responsible for network routing. Communications with the network router 72 may be performed via a network interface component 73.

As discussed above, for the purpose of influencing the display of web site content, the system functions to deduce a context for a user's interaction with the server processing device 68. To this end, when a user interacts with the server processing device 68 the server processing device 68 will be able to discern, using well known technologies, the geo-location of the user, e.g., the latitude, longitude, time zone, city, country, etc. from which the user is accessing the server processing device 68. It will be appreciated that the geo-location information may also be explicitly provided to the server processing device 68 by the user. To then deduce a context for the interaction a user is having with the server processing device 68, the server processing device 68 uses the geo-location information of the user to generally categorize the user. For example, the server processing device 68 may use the geo-location information to categorize the user as likely to be a B2C customer or likely to be a B2B customer, as likely to need certain weather or climate related supplies, etc.

Figure 4:
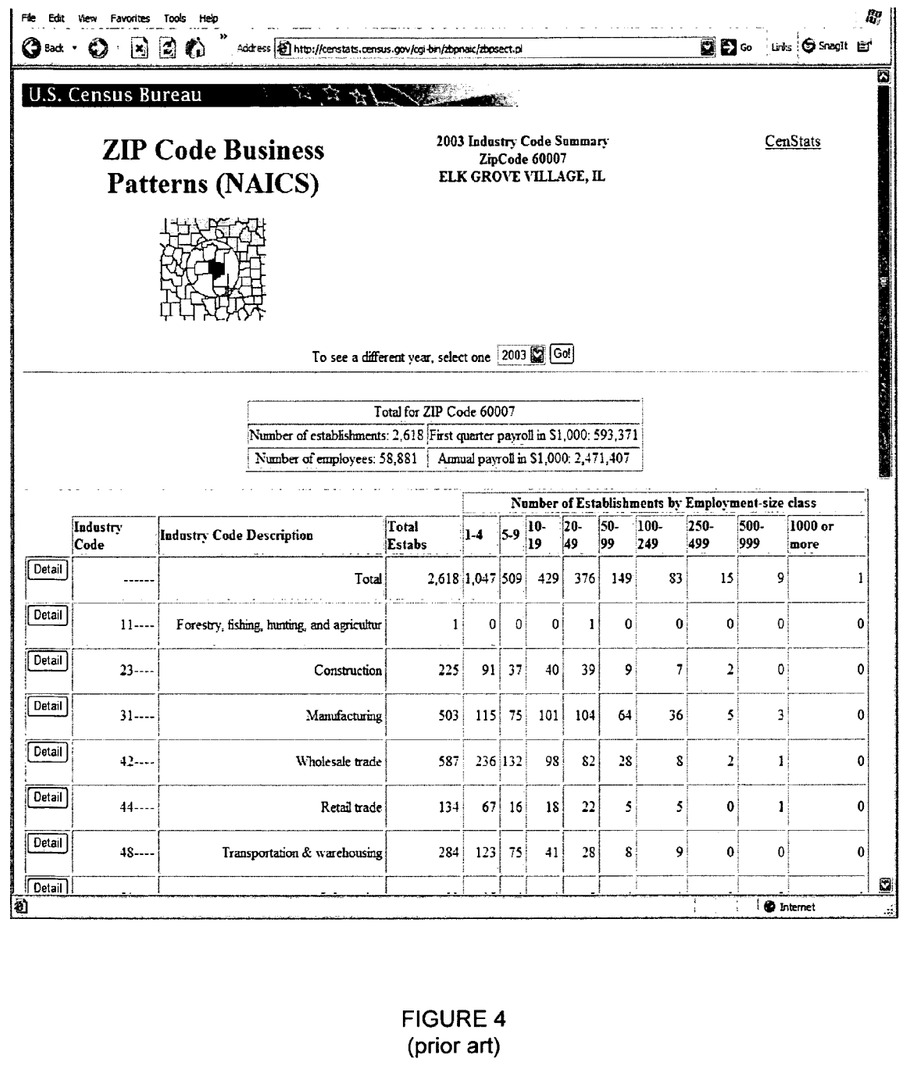
FIG. 4 is a screen shot illustrating a prior art repository of census data.

For classifying a user as likely to be a B2C customer or likely to be a B2B customer, the system may utilize readily available population density information such as, for example, information that is published by the U.S. Census Bureau as shown in prior art FIG. 4. More particularly, the system may use the geo-location information for the user to determine the industrial density of the city or region corresponding to the geo-location of the user. With a knowledge of the industrial density of the geo-location of the user, the system may then classify the user interaction as originating from an area of industrial density (e.g., an area having at least a threshold percentage or number of businesses in the construction, manufacturing, wholesale, etc. business) or residential density (e.g., an area having less than a threshold percentage or number of businesses in the construction, manufacturing, wholesale, etc. business) which, in turn, allows the system to classify the user as likely being a B2B customer or as likely being a B2C customer, respectively. It will also be appreciated that this methodology may be utilized to provide varying levels of confidence as to the type of user, e.g., a high likelihood of the user being a B2B customer (e.g., industrial density of the locale indicated by the geo-location information of the user meets a first threshold), a medium likelihood of the user being a B2B customer (e.g., industrial density of the locale indicated by the geo-location information of the user is below the first threshold but meets a second, lower threshold), and a low likelihood of the user being a B2B customer (e.g., industrial density of the locale indicated by the geo-location information of the user is below the second, lower threshold). Having classified the user by means of the geo-location of the user, the system has thus deduced a context for the user's interaction with the system which deduced context may then be used, for example, to select web site content to provision to the user in keeping with the deduced context.

By way of further example, the system may use the geo-location deduced context to determine appropriate times to present a "sponsored link" of a B2B company in response to a user's interaction with an Internet web portal. For instance, the system may employ a decision table which considers both the classification for the user as deduced from the industrial density of the locale indicated by the geo-location information of the user as well as the user's geo-location time to determine whether or not it is appropriate to present a "sponsored link" of a B2B company in response to a user's interaction with the Internet web portal. An example decision table is shown as follows:

DECISION TABLE

| B2B Company Density within User ZIP | Time of Day | Day of Week | Display Link? |
|---|---|---|---|
| Low | Non-business Hours | Weekday | No |
| Low | Non-business Hours | Weekend | No |
| Low | Business Hours | Weekday | Yes |
| Low | Business Hours | Weekend | No |
| Medium | Non-business Hours | Weekday | No |
| Medium | Non-business Hours | Weekend | No |
| Medium | Business Hours | Weekday | Yes |
| Medium | Business Hours | Weekend | Yes |
| High | Non-business Hours | Weekday | Yes |
| High | Non-business Hours | Weekend | No |
| High | Business Hours | Weekday | Yes |
| High | Business Hours | Weekend | Yes |

In a similar manner the system may also use the geo-location deduced context to provide search results that are more likely to be relevant to what a user was searching for, particularly in those circumstances where a search term is subject to multiple different meanings. By way of still further example, considering a search using the keyword "pumps" provided by a user on a Saturday afternoon from a geo-location which indicates that the user is not likely to be a B2B customer, e.g., the locale of the user as indicated by the geo-location is low industrial density, the system may function to respond to such a search by providing search results or "sponsored links" for business associated with shoes while avoiding the provisioning of search results or "sponsored links" for B2B enterprises that market industrial fluid moving pumps. Likewise, considering a user using the keyword "screwdriver" on a Tuesday afternoon from a geo-location which indicates the center of large city, the system may respond by presenting an advertisement for a cushion grip screwdriver offered for sale via a B2B enterprise since, in this example case, the search was issued during normal business hours and comes from a location of high B2B customer density with tall office and condominium buildings, hotels, institutions, etc. whereas, if the same keyword search is performed on a Saturday night from the same geo-location, the system may respond not by presenting the B2B advertisement but by presenting more B2C related or general interest type web-based content. In this latter instance, it is recognized that the user may be referring to an alcoholic drink and, if the user was truly trying to purchase a screwdriver at this time of day and day of week, the user is most likely a B2C customer and a B2B sponsored advertisement for screwdrivers displayed to such a customer would nevertheless not generally be effective.

While the above-described methods utilize industrial density to influence the display of web site content, it will be appreciated that other density characteristics, such as residential density, may also be used to achieve the same goals.

By way of still further example, the system may utilize geo-location information and time of day or other readily available information associated with the geo-location of the user to seek to provide search results that are more likely to be relevant to conditions a user is likely to be experiencing. Considering a user that performs a keyword search using "ice." In response to such a search, the system can use the geo-location of the user to bias the results of the search that are thus presented to the user. That is, if the user's geo-location information indicated that the user was based in Miami, the system may deduce a context for the search that functions to move any "ice" related cold-weather products towards the bottom of the search results list (or simply not show such products to the user) while presenting to the user "ice" related warm-weather products that are offered for sale by the vendor and which the deduced context indicates are more likely to be products of interest to the user as illustrated in FIG. 5. If, however, the user's geo-location indicated that the user was based in Boston, the system may function to move any "ice" related warm-weather products towards the bottom of the search results list (or simply not show such products to the user) while presenting to the user "ice" related cold-weather products that are offered for sale by the vendor and which the deduced context indicates are more likely to be products of interest to the user as illustrated in FIG. 6. While these examples disclose using a deduced context to bias placement of search results returned in response to a search query, it will be appreciated that other means may be used to call the attention of a user to products which the system determines should be relevant to a deduced context, such as by highlighting links, providing rankings, etc.

In yet another example, the system may function to use information associated with a geo-location such as rules and regulations relevant to a geo-location to influence the presentation of web site content. For instance, if a state has a regulation that prohibits the use, importation, etc. of certain products and the geo-location information indicates the user is within that state, the system may, instead of merely including a notation on search engine results that ubiquitously informs all user's that the certain products are limited where they may be used, imported, etc., simply bias downward or remove such products from any search results that are presented to that user. Still further, if the geo-location of a user indicates that the user is currently in a locale where there is severe weather or where severe weather is predicted, the system may use this information to thereby cause the user to be presented with advertisements for products that are commonly used to grapple with the effects and aftermath of that particular severe weather, for example, by biasing such products towards the top of a search engine results lists. Yet further, if the geo-location of a user indicates that the user is in a location where a certain type of customer is located (e.g., military base), the system may use this information to thereby cause the user to be presented with advertisements for products that have already negotiated prices and statuses of "approved to buy" again, for example, by biasing such products towards the top of a search engine results list.

While specific embodiments of the invention and examples of its use have been described in detail, it will be appreciated by those skilled in the art that various modifications and alternatives to those details could be developed in light of the overall teachings of the disclosure. Accordingly, the particular arrangements disclosed and examples provided are meant to be illustrative only and not limiting as to the scope of the invention which is to be given the full breadth of the appended claims and any equivalents thereof.

What is being claimed is:

1. A method performed by a web site portal for influencing display of web site content, comprising:
    using geo-location information associated with a user's interaction with the web site portal to deduce a classification for the user; and
    using the deduced classification for the user to influence the display of web site content that is provided by the web site portal in response to the user's interaction;
    wherein the deduced classification for the user is arrived at via consideration of an industrial density characteristic for a locale indicated by the geo-location information associated with the user's interaction.

2. The method as recited in claim 1, wherein the industrial density characteristic is derived from United States census bureau data for the locale.

3. The method as recited in claim 1, wherein using the deduced classification for the user comprises determining if web site content of a B2B enterprise is to be displayed.

4. The method as recited in claim 1, wherein using the deduced classification for the user comprises determining which sponsored web site content is to be displayed.

5. The method as recited in claim 1, wherein using the deduced classification for the user comprises determining if web site content is highlighted when displayed.

6. The method as recited in claim 1, wherein using the deduced classification for the user comprises ordering a list of web site content.

7. The method as recited in claim 1, wherein the user's interaction comprises using a keyword to perform a search term query and the web site content comprises search results returned in response to the search term query.

8. A computer readable media embodied in a tangible electronic storage device associated with a web site portal having stored thereon computer executable instructions for use in influencing display of web site content, the instructions performing steps comprising:
    using geo-location information associated with a user's interaction with the web site portal to deduce a classification for the user, and
    using the deduced classification for the user to influence the display of web site content that is provided by the web site portal in response to the user's interaction;
    wherein the deduced classification for the user context is arrived at via consideration of an industrial density characteristic for a locale indicated by the geo-location information associated with the user's interaction.

9. The computer readable media as recited in claim 8, wherein using the deduced classification for the user comprises determining if web site content of a B2B enterprise is to be displayed.

10. The computer readable media as recited in claim 8, wherein using the deduced classification for the user comprises determining which sponsored web site content is to be displayed.

* * * * *